(12) United States Patent
Walker et al.

(10) Patent No.: US 11,842,269 B2
(45) Date of Patent: Dec. 12, 2023

(54) AI ENABLED SENSOR DATA ACQUISITION

(71) Applicant: Hitachi, Ltd., Tokyo (JP)

(72) Inventors: Andrew Walker, Sunnyvale, CA (US);
Joydeep Acharya, Milpitas, CA (US)

(73) Assignee: HITACHI, LTD., Tokyo (JP)

( * ) Notice: Subject to any disclaimer, the term of this patent is extended or adjusted under 35 U.S.C. 154(b) by 868 days.

(21) Appl. No.: 16/886,428

(22) Filed: May 28, 2020

(65) Prior Publication Data

US 2021/0375492 A1   Dec. 2, 2021

(51) Int. Cl.
*G06N 3/08* (2023.01)
*G06N 20/00* (2019.01)
*G06F 17/40* (2006.01)

(52) U.S. Cl.
CPC ............. *G06N 3/08* (2013.01); *G06N 20/00* (2019.01); *G06F 17/40* (2013.01)

(58) Field of Classification Search
CPC ............ G05B 23/0218; G05B 23/0221; G05B 13/027; G05B 13/048; G06F 17/40; G06F 11/30; G06F 11/3476; G06F 16/22; G06F 18/25; G06F 16/258; G06F 18/23213; G06F 18/2433; G06N 3/08; G06N 20/00; G06N 5/04; G06N 3/045; G06N 3/048; G06N 3/082; G06N 20/20; G06N 3/04; G06N 3/047; G06N 3/088; G06N 7/01; G16Y 40/20; G16Y 40/10; G16Y 40/35; G16Y 30/00; G16Y 20/10; G16Y 20/30; G16Y 40/30; G16Y 20/00; H04L 67/12; H04L 67/10; H04L 67/303; H04L 41/0833; H04W 4/38; H04W 28/08; H04W 24/02; H04W 52/0258
See application file for complete search history.

(56) References Cited

U.S. PATENT DOCUMENTS

| 10,409,245 B2 | 9/2019 | Cella et al. |
| 2016/0283524 A1 | 9/2016 | Hill et al. |
| 2017/0166217 A1* | 6/2017 | Sbianchi .............. H04B 1/1036 |
| 2017/0222674 A1 | 8/2017 | Shiramizu et al. |

(Continued)

FOREIGN PATENT DOCUMENTS

JP   2015-177848 A   10/2015

OTHER PUBLICATIONS

Dias, G-M. et al. "Adapting Sampling Interval of Sensor Networks Using On-Line Reinforcement Learning" 2016 IEEE 3rd World Forum on Internet of Things (WF-IoT), 2016 (6 pages).

(Continued)

*Primary Examiner* — Daniel R Miller
*Assistant Examiner* — Eric Sebastian Von Wald
(74) *Attorney, Agent, or Firm* — Procopio, Cory, Hargreaves & Savitch LLP

(57) ABSTRACT

Example implementations described herein can dynamically adapt to changing nature of sensor data traffic and through artificial intelligence (AI, strike a good tradeoff between reducing volume of sensed data, and retain enough data fidelity so that subsequent analytics applications perform well. The example implementations eliminate heuristic methods of setting sensing parameters (such as DAQ sampling rate, resolution etc.) and replaces them with an automated, AI driven edge solution core that can be readily ported on any Internet of Things (IoT) edge gateway that is connected to the DAQ.

12 Claims, 19 Drawing Sheets

(56) References Cited

U.S. PATENT DOCUMENTS

| | | | |
|---|---|---|---|
| 2018/0137691 A1* | 5/2018 | Satou | G06F 17/40 |
| 2019/0033847 A1 | 1/2019 | Cella et al. | |
| 2019/0286725 A1* | 9/2019 | Gawlick | G06F 16/1744 |
| 2019/0302750 A1* | 10/2019 | Oh | G05B 23/0221 |
| 2020/0184278 A1* | 6/2020 | Zadeh | G06N 3/044 |
| 2020/0249962 A1* | 8/2020 | Vichare | G06F 9/5083 |

OTHER PUBLICATIONS

Li, J. et. al. "Rate-Constrained Distributed Estimation in Wireless Sensor Networks", Proc. of ICCCN, 2006, pp. 317-322.

Tishby, N. et al. "The Information Bottleneck Method" The 37th annual Allerton Conference on Communication, Control, and Computing, Sep. 30, 1999, pp. 1-16.

Cobb, A. et al, "Adaptive sampling of lion accelerometer data", 2016, pp. 1-14.

* cited by examiner

| Resolution Index | Number of Analog Inputs | Maximum Scan Rate |
|---|---|---|
| 1 | 1 | 100 kHz |
| 1 | 2 | 50 kHz |
| 2 | 1 | 48 kHz |
| 2 | 2 | 19.8 kHz |
| 3 | 1 | 22 kHz |
| 3 | 2 | 9.9 kHz |
| 4 | 1 | 11 kHz |
| 4 | 2 | 4.9 kHz |

FIG. 4(b)

AI ENABLED SENSOR DATA ACQUISITION

BACKGROUND

Field

The present disclosure is generally directed to sensor data acquisition, and more specifically, towards utilization of artificial intelligence (AI) to facilitate sensor data acquisition.

Related Art

High quality data is instrumental in producing effective models for analytics. Thus, the data acquisition process is important for ensuring that high quality data reaches the target model. However, there are often real-world barriers that impose constraints during data collection. For industrial analytics, a key source of data comes from sensors, wherein massive amounts of data need to be gathered, transformed, and transported for use in analytics insights.

Central to this task are the data acquisition systems (henceforth, referred to as DAQ) and the Internet of Things (IoT) platform. The data acquisition process in an industrial setting is shown in FIG. 1. In factories, power plants, power grids, or other forms of social infrastructure, there are various industrial assets 101 that can have important functionality. Sensors S101, S102 near the asset of interest are sent to a DAQ 102. The wideband signal from the sensors S101, S102 is analog and so needs to pass through an Analog/Digital Converter (ADC) in the DAQ before it passes through an IoT gateway 103. From here, the data can ultimately go to an edge server 104, where the data may pass through an analytics module and provide insights.

In industrial settings, wideband (analog) sensor signals are of key interest. These waveforms such as vibration, acoustic, ultrasonic, etc. are characterized by their frequency components. To capture the information in these high frequency components, it is necessary to sample at a sufficiently high rate. The highest fidelity data is thus obtained by choosing the maximum value of sampling frequency. However, this can be expensive in terms of storage, processing power, and sensor battery life. Moreover, the sensor signal may not have relevant information in high frequency components. FIG. 2 illustrates an example of the effect of the sampling rate on the final observed signal. The effect on sampling rate plays a significant rate on the final observed signal (this information corresponds to what happens at the level of the DAQ 102 in FIG. 1).

An analog signal 201 from a sensor is sent through an analog input channel 202, which may be wired or wireless. Under the choice of some parameter that decides how many samples are collected per second (the so-called sampling rate), the analog signal undergoes an analog-to-digital-conversion 203. The resulting (observed) digital signal (one of 204, 205, 206) is then sent to an IoT gateway. The choice of sampling rate plays a critical role in the observed signal. If the sampling rate is chosen to be a high rate A, then the observed signal 204 is faithful to the original signal 201 in that it preserves most of the information. However, this comes at the cost of sending more samples to preserve the information content of the original signal. Thus, it might be more desirable to send the signal at a lower sampling rate C, which creates a sparser signal 206. However, sending at too low of a sampling rate may create a signal that is not faithful to the original signal, and so too much information is lost. The optimal solution here is some type of compromise A<B<C, so that under this sampling rate B, it captures most of the relevant information from the true signal 201 while also sending as little data as possible to the IoT gateway.

Going even further into the ADC 203 shown in FIG. 2, digital conversion introduces some quantization noise into the system. As other parameters inside the DAQ, one can decide the range of the signal, as well as the number of quantization levels (a function of the number of bits) to divide the range into. FIG. 3 illustrates the effect that the choice in the number of bits can have on the observed signal. After the signal is sampled, it must pass through a quantizer 2032 that places the signal sample into one of the $2^b$ quantization levels, where b is the number of bits that are allocated per sample. Choosing too few bins as in 2035 (here, b=2, so the number of levels=4 corresponds to the values 1, 0, −1, −2) results in a signal that is not faithful to the original sample 2031, and so too much information is lost. On the other hand, choosing enough bins as in 2033 (b=4) results in preserving as much information as can be from the original signal, but at the cost of sending double the bits. Depending on storage constraints, the optimal choice might lie somewhere in the middle as in signal 2034 (here, b=3).

It is sometimes the case as well that there are multiple sensors sharing the same DAQ, where there is potentially only one ADC for multiple analog input channels. This constraint can be relaxed for high end DAQs, but they are cost-prohibitive and so may not be suitable for deployment at scale in an industrial setting. It can be more practical to encounter a situation in which there are multiple analog inputs for a single ADC, which will impose further constraints on the maximum sampling rate obtainable for each analog input.

FIG. 4(a) illustrates an example of two analog channels passing through an ADC. In FIG. 4(a), two analog channels 207, 208 pass through a single ADC 203. As a hardware limitation, each analog input cannot have its own sampling rate; the multiplexer enforces a common sampling rate across all analog inputs that are sampling data. This results in the situation where it might be desirable to sample both signals at a sufficiently high rate as shown at 209, but this is not possible due to the limitations of the DAQ. Thus, both signals have to be sampled at a less than ideal rate 210. Further, the number of analog inputs to use becomes another parameter of the DAQ, where the number of channels to use is generally decided by either heuristics or domain knowledge.

Based on the above description, there are three practical settings involving DAQ parameter configuration that are to be optimized: a) the sampling rate, b) the bits per sample, and c) the number of analog inputs. The reason that this optimization problem is difficult is that practical considerations like power consumption, storage, and hardware limitations may prevent the ideal parameter configuration (which would be the maximum value of each of these parameters for the underlying target application). Moreover, there is a coupling between these parameters: increasing one generally forces the other to be lower. FIG. 4(b) illustrates an example chart for a DAQ regarding the possible tradeoffs.

Thus, a choice must be made regarding what the optimal DAQ parameter configuration should be, subject to the constraint that there are limitations on which parameters are feasible or admissible. In terms of related art practices for DAQ parameter configuration, there is generally an initial one time configuration operation (fix the sampling rate, bits per sample, and number of analog inputs to collect data). This may be periodically adjusted, but generally is not related to the real-time application performance. FIG. 5 illustrates an example of setting the parameters in place for the DAQ, where before a digital signal is sent from the DAQ 102 to the IoT gateway 103, the parameters for the DAQ are set in place for a significant amount of time.

SUMMARY

Example implementations involve systems and methods for automatically deciding the optimal set of sensor parameters. In the related art, there is a lack of a DAQ parameter configuration scheme that addresses the following problems: 1) Finding a scheme that adapts to the short-term variations in the signal while acknowledging potential long-term variations in the signal that might require parameter adjustment, 2) Finding a single, optimal sensor parameter configuration that can produce a compromise between different states that the signal might be in (e.g., that depends on the physical states of the underlying asset the sensor is monitoring such as a motor), 3) Utilizing the spectral information within the signal (this is specific to waveform sensor data), and 4) Producing a scheme that can accommodate learning of the optimal DAQ parameter configuration in cases involving multiple sensor parameters.

Example implementation described herein involve finding the appropriate DAQ parameters (e.g., sampling frequency, resolution) over the all short-term variations in the machine/system states, which can entail indirect recognition of the machine states with unsupervised learning based purely on the sensor traffic pattern. By comparing against the signal obtained when maximal DAQ parameters are chosen (e.g. highest-available sampling frequency, resolution pair), the example implementations choose the DAQ parameter by playing a reinforcement learning game where loss is defined in terms of the above comparison and set the appropriate DAQ parameter.

Example implementations can further detect the long-term pattern change in machine/system states and restart the short-term parameter derivation process to balance the sampling frequency and resolution value, which are jointly optimized while playing the reinforcement learning game.

Aspects of the present disclosure involve a method for a system having sensors providing sensor data, the method involving a) sampling the sensor data under a maximum DAQ parameters configuration for the system; b) learning an optimized DAQ parameters configuration for the system through a reinforcement learning process involving sampling a DAQ parameters configuration from a probability distribution of DAQ parameters for the system, comparing a first fast Fourier transform (FFT) of the sampled sensor data under the maximum DAQ parameters configuration with a second FFT of the sampled sensor data under the sampled DAQ parameters configuration, and updating the probability distribution over DAQ parameters for the system based on the comparing; and c) setting the optimized DAQ parameters configuration for the sensors of the system based on the probability distribution over DAQ parameters.

Aspects of the present disclosure involve a computer program storing instructions for a system having sensors providing sensor data, the instructions involving a) sampling the sensor data under a maximum DAQ parameters configuration for the system; b) learning an optimized DAQ parameters configuration for the system through a reinforcement learning process involving sampling a DAQ parameters configuration from a probability distribution of DAQ parameters for the system, comparing a first fast Fourier transform (FFT) of the sampled sensor data under the maximum DAQ parameters configuration with a second FFT of the sampled sensor data under the sampled DAQ parameters configuration, and updating the probability distribution over DAQ parameters for the system based on the comparing; and c) setting the optimized DAQ parameters configuration for the sensors of the system based on the probability distribution over DAQ parameters. The computer program may be stored on a non-transitory computer readable medium, storing instructions for executing a process.

Aspects of the present disclosure involve a system having sensors providing sensor data, means for a) sampling the sensor data under a maximum DAQ parameters configuration for the system; b) learning an optimized DAQ parameters configuration for the system through a reinforcement learning process involving means for sampling a DAQ parameters configuration from a probability distribution of DAQ parameters for the system, means for comparing a first fast Fourier transform (FFT) of the sampled sensor data under the maximum DAQ parameters configuration with a second FFT of the sampled sensor data under the sampled DAQ parameters configuration, and updating the probability distribution over DAQ parameters for the system based on the comparing; and c) means for setting the optimized DAQ parameters configuration for the sensors of the system based on the probability distribution over DAQ parameters.

Aspects of the present disclosure involve a management apparatus for a system having sensors providing sensor data, the management apparatus involving a processor, configured to: a) sample the sensor data under a maximum DAQ parameters configuration for the system; b) learn an optimized DAQ parameters configuration for the system through a reinforcement learning process involving sampling a DAQ parameters configuration from a probability distribution of DAQ parameters for the system, comparing a first fast Fourier transform (FFT) of the sampled sensor data under the maximum DAQ parameters configuration with a second FFT of the sampled sensor data under the sampled DAQ parameters configuration, and updating the probability distribution over DAQ parameters for the system based on the comparing; and c) set the optimized DAQ parameters configuration for the sensors of the system based on the probability distribution over DAQ parameters.

BRIEF DESCRIPTION OF DRAWINGS

FIG. 4(b) illustrates an example chart for a DAQ regarding the possible tradeoffs.

DETAILED DESCRIPTION

Figure 1:
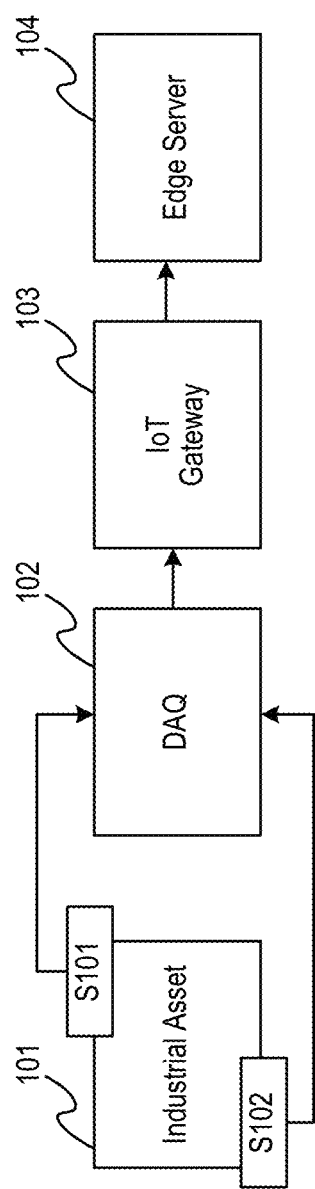
FIG. 1 illustrates an example data acquisition process in an industrial setting.
Figure 2:
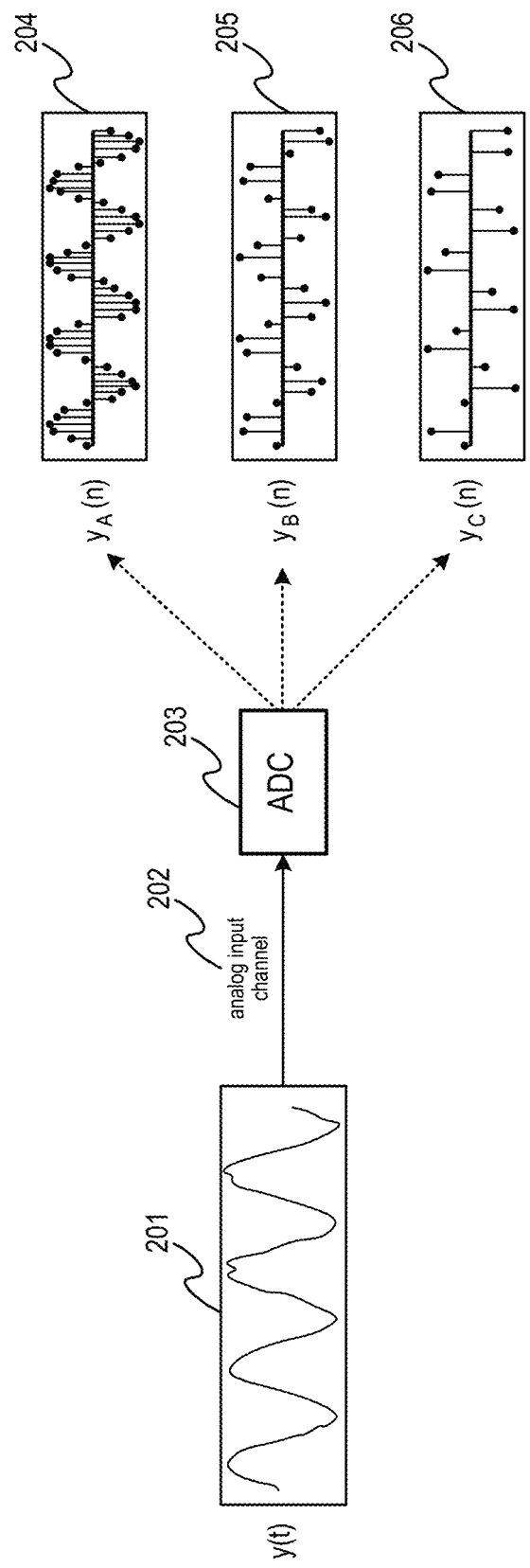
FIG. 2 illustrates an example of the effect of the sampling rate on the final observed signal.
Figure 3:
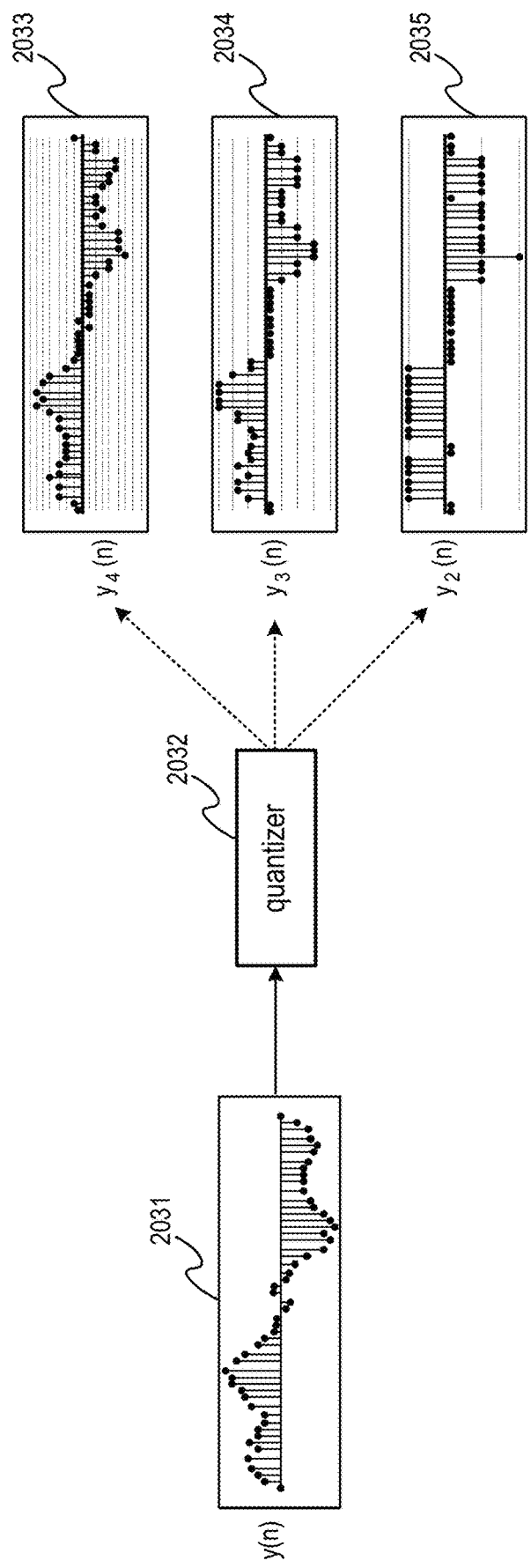
FIG. 3 illustrates the effect that the choice in the number of bits can have on the observed signal.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve a software-based, containerized microservice that can run on the edge/IoT gateway (GW) platform. The example implementations described herein are robust enough to handle systems that incorporate one or more analog inputs, and can simultaneously attempt to optimize both the bit resolution and sampling rate. Example implementations involve a practical method to choose DAQ parameters (sampling, resolution) that is optimal over all short-term variations in the signal and can dynamically adapt to the long-term variations. The general strategy follows under the umbrella of what is known as adaptive sampling, wherein specifications for choosing certain features are adapted by leveraging insights from data as it is produced. In the language of machine learning, this means that the optimal DAQ parameters will be learned in an online fashion by utilizing the data gathered from the DAQ to update the estimated optimal collection of sensor parameters. This estimation is encoded in a probability distribution that describes the likelihood of each sensor parameter configuration as being the optimal choice.

Figure 6:
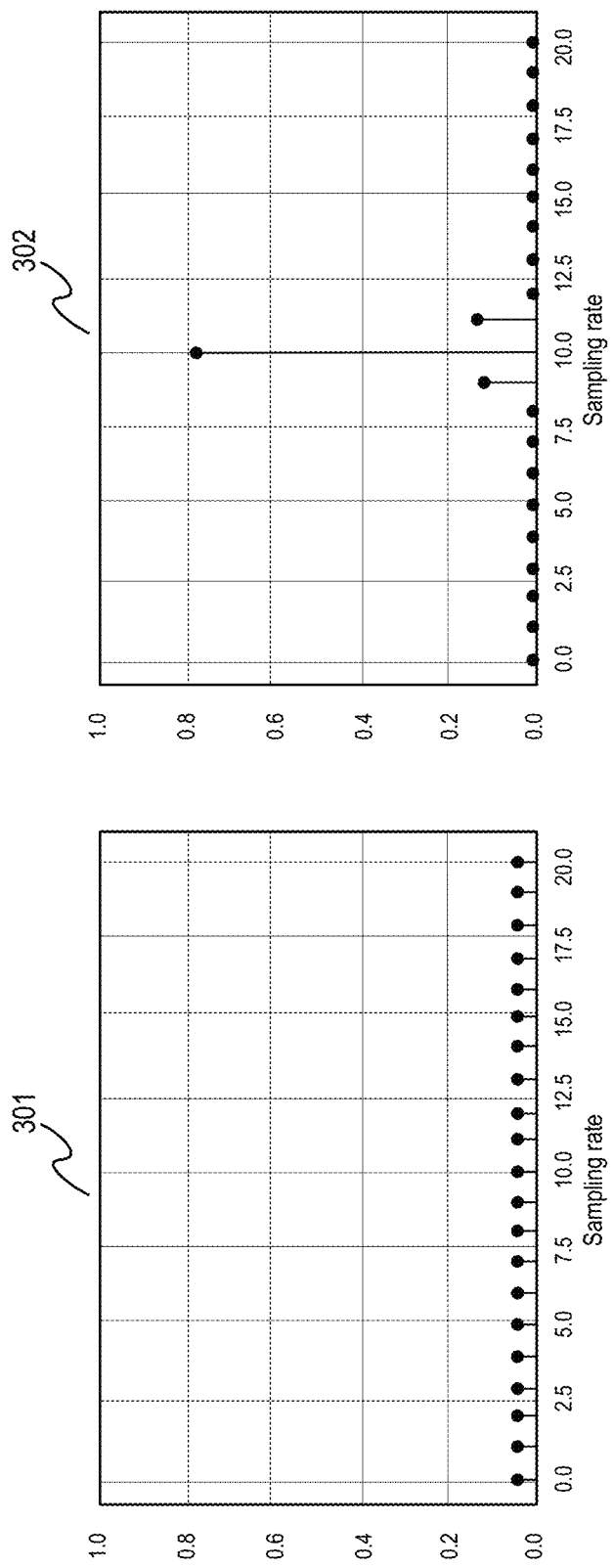
FIG. 6 illustrates an example probability distribution indicative of the likelihood of each sensor parameter configuration being optimal, in accordance with an example implementation.

FIG. 6 illustrates an example probability distribution indicative of the likelihood of each sensor parameter configuration being optimal, in accordance with an example implementation. In the example of FIG. 6, the left distribution 301 has no knowledge about which sampling rate is optimal; thus each sampling rate is assigned equal probability in regards to being the optimal sampling rate. After data is collected, the system may learn that some sampling rates are more likely to be optimal than others. This new outlook is reflected in an updated probability distribution 302, which places a high weight on only a few different sampling rates after observing the data.

The above description in the adaptive sampling framework to use the data gathered under a certain choice of sensor parameters to influence the system's opinion about how likely this was the optimal DAQ parameter configuration. For data coming from waveform sensors such as vibration/acoustics, most of the information of interest is contained in the frequency domain rather than the time domain. Here, the Fast Fourier Transform (FFT) is the fundamental tool for analyzing the frequency characteristics of a signal.

Figure 7:
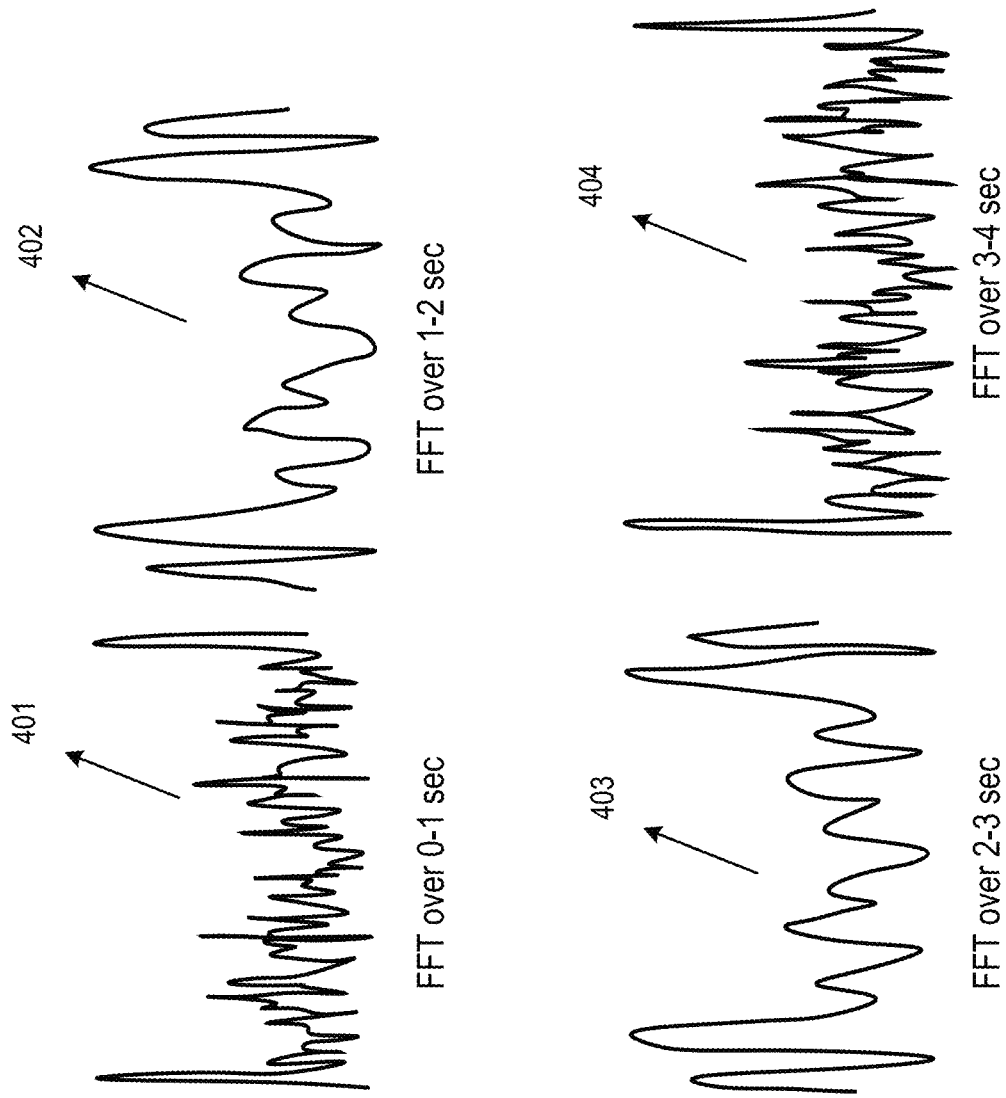
FIG. 7 illustrates an example of the change of FFT over short time windows, in accordance with an example implementation.

FIG. 7 illustrates an example of the change of FFT over short time windows, in accordance with an example implementation. This can happen due to behavior of the underlying asset the sensor is monitoring. For instance, consider a tool that is periodically inserted inside a workpiece for cutting or drilling. The vibrations originating from the tool when it is inside the workpiece cutting or drilling will be very different when it is being pulled outside. Each of the graphs 401, 402, 403, 404 illustrates what the FFT's power spectrum can look like over a short window of time. The frequencies of interest may change as time elapses, depending on the current state of the machine.

Looking at these individual frames only gives a short-time view at which frequencies are of interest. However, in the long run, only observing the FFT on a window-by-window case may result in missing the long-term trending behavior in the signal (e.g., how the signal will degrade as the health condition of the asset begins to drop).

Figure 8:
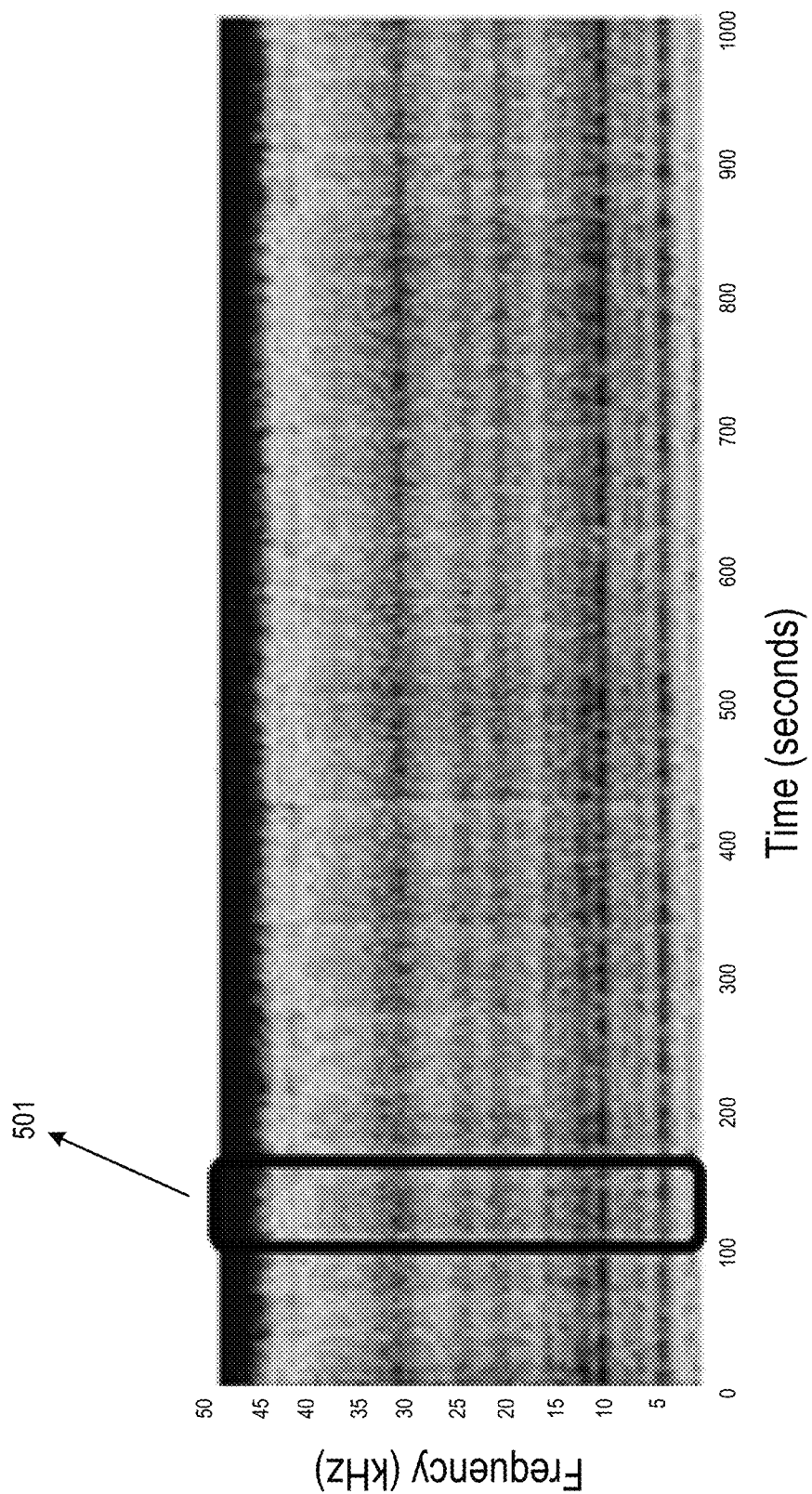
FIG. 8 illustrates an example spectrogram to derive long-term trending behavior, in accordance with an example implementation.

FIG. 8 illustrates an example spectrogram to derive long-term trending behavior, in accordance with an example implementation. By only looking at a short window 501, the frequency content can be obtained for a moment in time. By piecing together these windows, a long-term view of how the signal evolves over time can thereby be obtained.

Thus, going back to the problem at the level of the DAQ, example implementations are directed to facilitating a smart DAQ configuration scheme that can consider both short and long-term variations in the signal. One method for DAQ parameter configuration that achieves this aim as outlined in FIG. 9.

Figure 9:
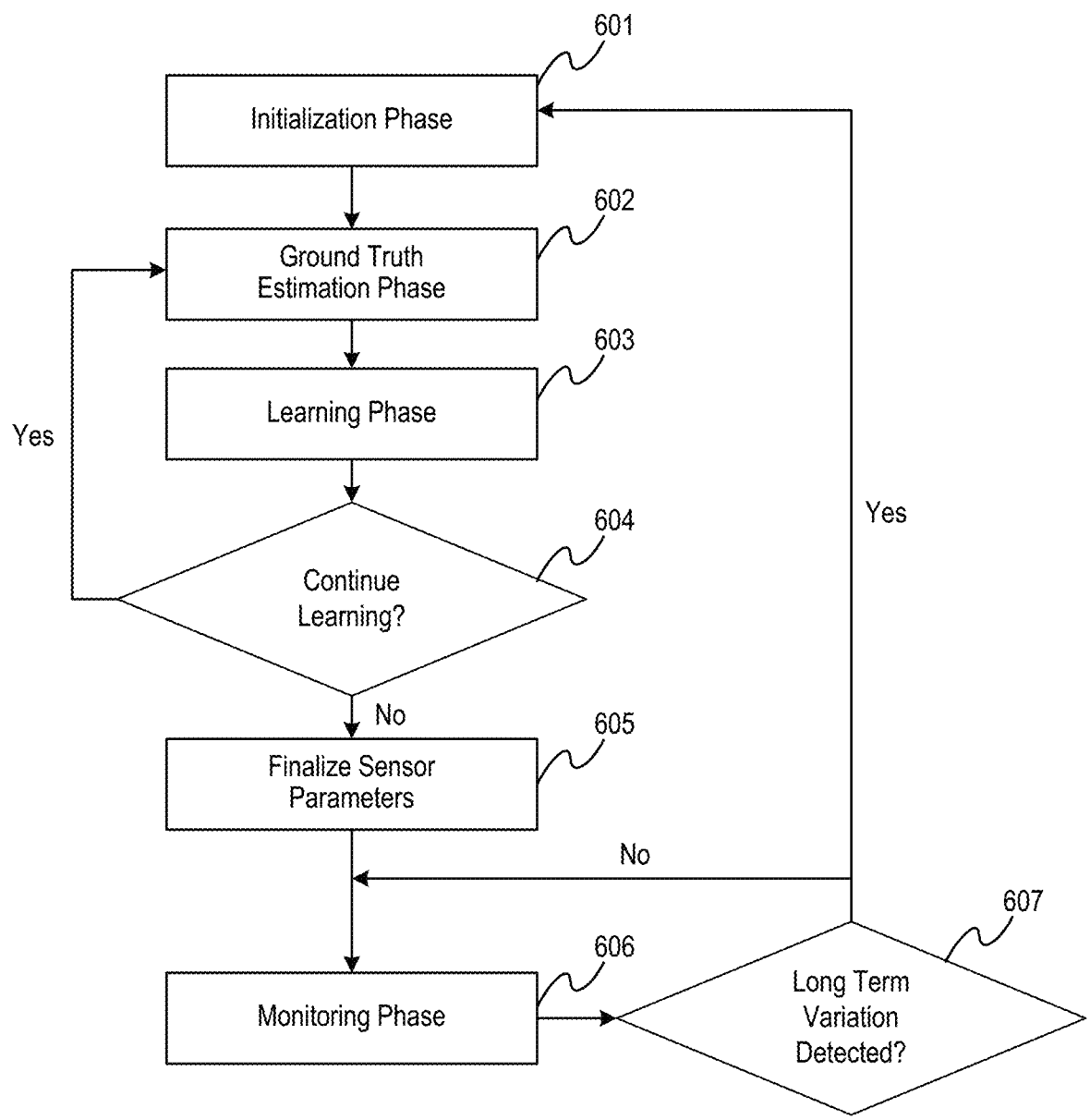
FIG. 9 illustrates an example method for DAQ parameter configuration, in accordance with an example implementation.

FIG. 9 illustrates an example method for DAQ parameter configuration, in accordance with an example implementation. After an initialization phase 601, the sensor network alternates between two phases: the ground truth estimation phase 602 and the learning phase 603. These two phases involve sampling the data under different DAQ parameters, collecting data, making comparisons, and then updating beliefs about the best possible parameter configuration. These phases are sequential, so that the ground truth estimation phase 602 precedes the learning phase 603, and then based on whether a certain number of cycles have passed or a confidence in the learning phase is obtained 604, the cycle either continues (Yes) to 602 or exits (No) to 605.

Whenever this cycle between the ground truth estimation phase 602 and learning phase 603 is over, based on the beliefs of the best sensor parameters gathered during the learning phases 603, a sensor parameter configuration is finalized 605. This is done based on a statistical property of the learned distribution over the space of possible sensor parameters; e.g., its expected value or the argmax of its probability mass function. After these DAQ parameters 605 are selected, data from the corresponding sensor(s) is collected for a certain amount of time, where the module undergoes a long-term monitoring phase 606. Here, there is no change in DAQ parameters, but data is collected and observed. By analyzing the frequency content of the long-term signal by extracting features from the spectrogram, a machine learning model can be trained to look for any trends or shifts in the frequency content. This long-term variation detection operation 607 is performed periodically, and if a significant shift is detected in the spectra of the observed signal, then this might be indicative of something that is not being fully captured under the current DAQ parameter configuration. Thus, the process must start over (Yes), and proceeds back to 601 such that the optimal sensor configuration is learned by alternating between the ground truth estimation phase 602 and learning phase 603 once more.

Figure 10:
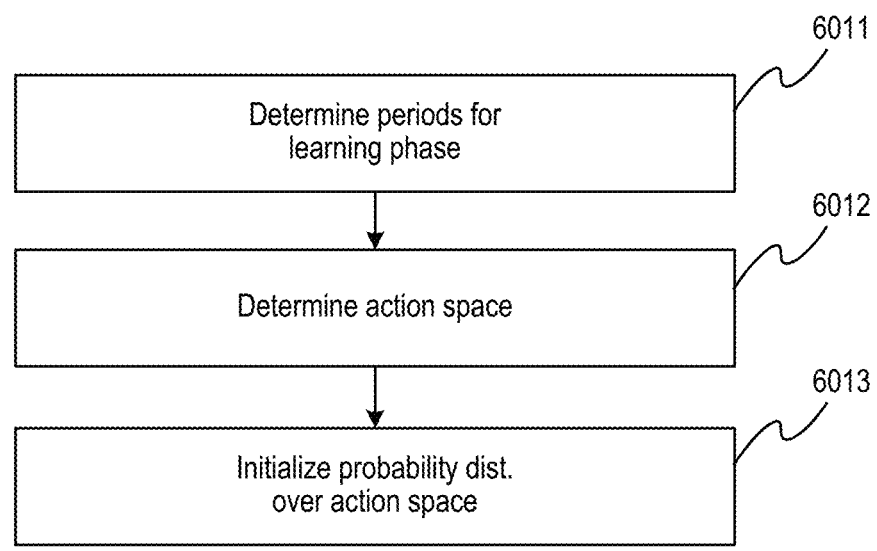
FIG. 10 illustrates an example of the initialization phase, in accordance with an example implementation.

FIG. 10 illustrates an example of the initialization phase, in accordance with an example implementation. The steps followed in the initialization phase 601 are outlined in FIG. 10 as follows. There are three sequential steps 6011-6013 that detail the rules for the "game" that learns the optimal DAQ parameters. The first step is to determine when or how the game will end at 6011, decided by either a certain confidence in what the optimal DAQ parameters are or how many rounds the game will go on. Next, an action space is defined at 6012. This again borrows from the language of reinforcement learning, wherein an action space in this setting refers to a subset of the possible DAQ configurations, and an action, which is an element of the action space, is a choice of DAQ parameters. It is not necessarily the case that all possible combinations of the different parameters along the DAQ are explored or considered, and so the action space is restricted to only the combinations that are of interest. The last step of the initialization phase is to place an initial distribution over the action space at 6013. This initial distribution can encode any prior estimation about what the most important sensor parameters are, and so might assign different probabilities to different actions. If there is no prior knowledge about the optimal action, the uniform distribution is assigned to the action space.

Figure 4A:
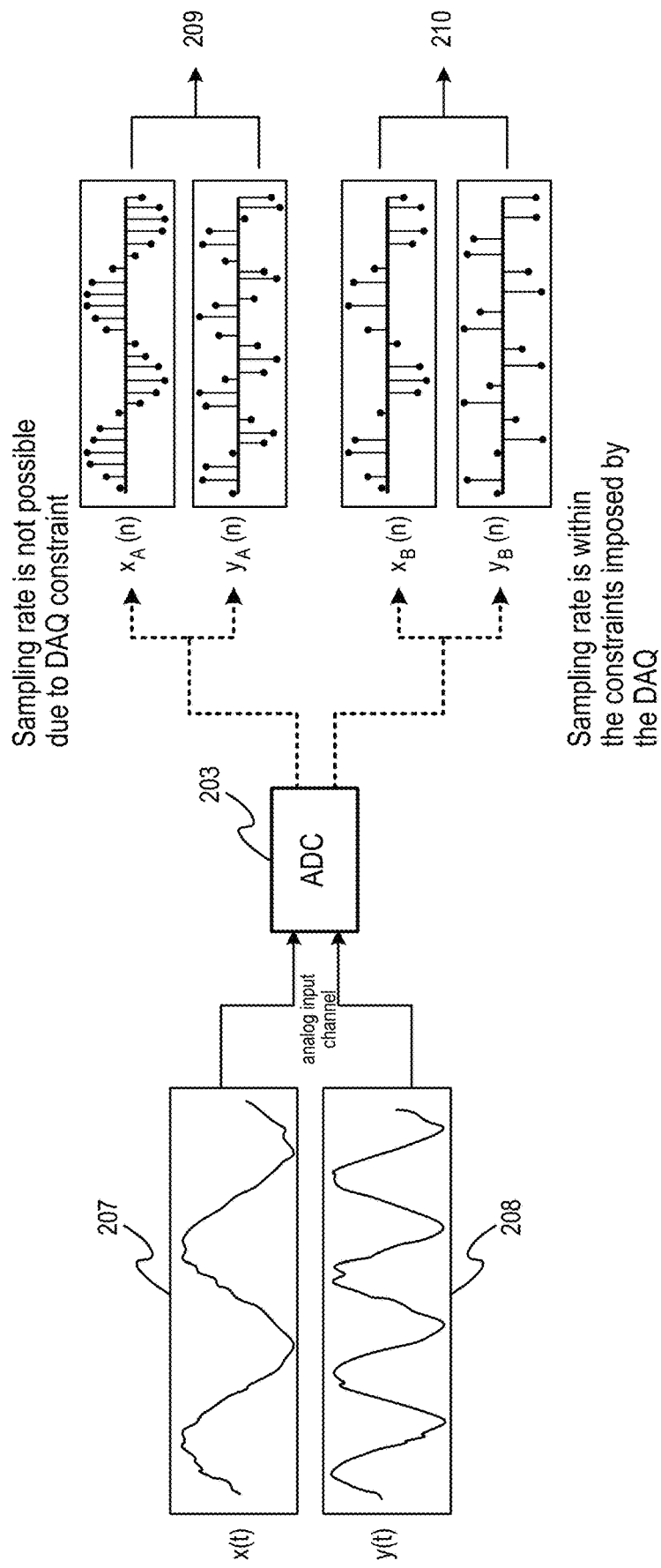
FIG. 4(a) illustrates an example of two analog channels passing through an ADC.
Figure 5:
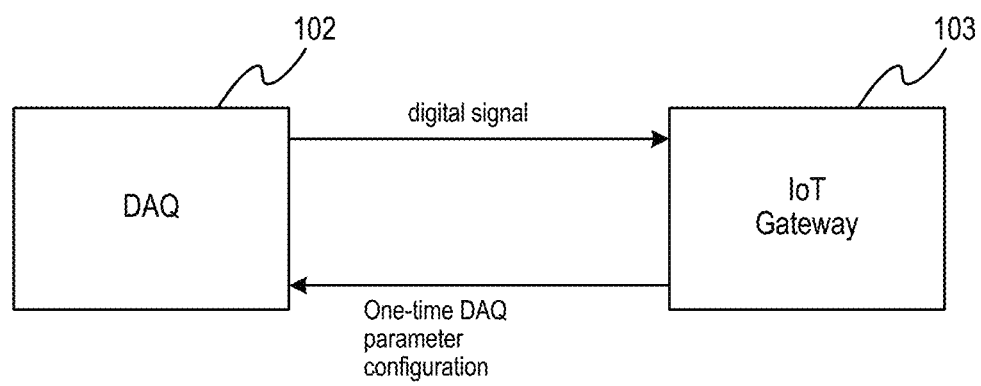
FIG. 5 illustrates an example of setting the parameters in place for the DAQ.
Figure 11:
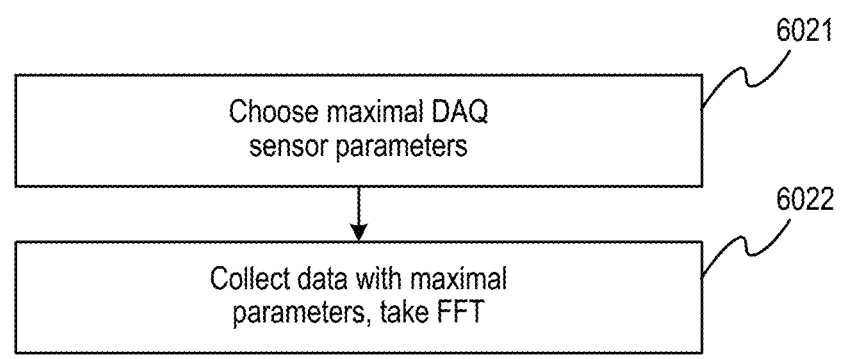
FIG. 11 illustrates an example of the ground truth phase, in accordance with an example implementation.

After the initialization phase, example implementations alternate between the ground truth estimation phase 602 and the learning phase 603. FIG. 11 illustrates an example of the ground truth phase, in accordance with an example implementation. The ground truth phase, as shown in FIG. 11, involves choosing the maximal DAQ sensor parameters 6021 under which the sampled signal 6022 best captures the true signal from the asset of interest. Here, optimal and maximal DAQ sensor parameters are distinguished, in that with the latter, power consumption or storage consideration is not taken into consideration; rather the focus is towards only preserving the information contained in the original analog signal. In the case where all but one parameter is fixed, choosing the maximal DAQ sensor parameters just amounts to setting the lone variable sensor parameter to the maximum value possible through the DAQ. In the case of more than one sensor parameter, as illustrated in FIG. 4(b), the tradeoffs involved between the different sensor parameters makes "maximal DAQ sensor parameters" 6021 not well-defined, as it may not be feasible to set each individual parameter to its maximum value and then collect data. In this case, an estimate is made regarding what the maximal parameter settings should be based on the sensors involved or apriori domain knowledge.

Figure 12:
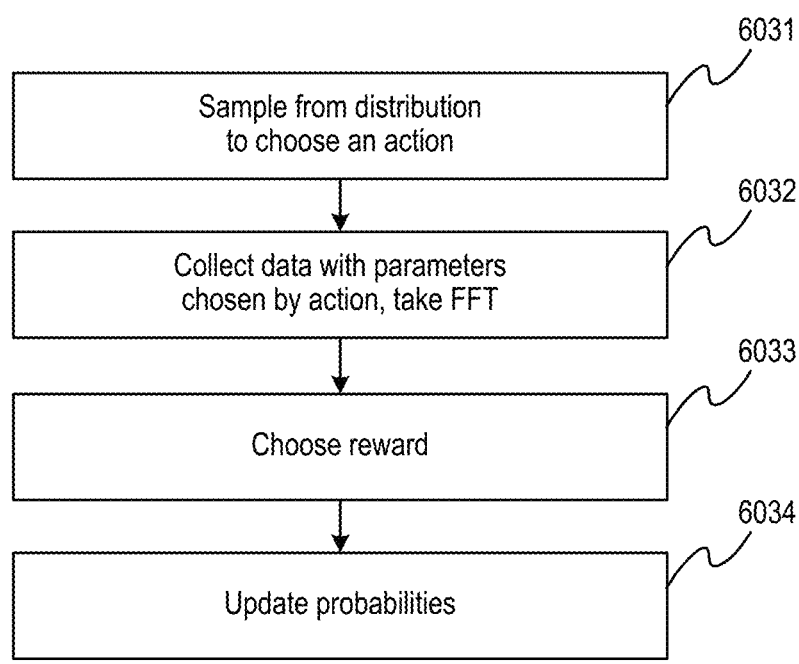
FIG. 12 illustrates an example of the learning phase, in accordance with an example implementation.

FIG. 12 illustrates an example of the learning phase, in accordance with an example implementation. The learning phase 603 is conducted as part of a reinforcement learning-based game as shown in FIG. 12. After the ground truth estimation phase 602, example implementations execute the learning phase 603 to make a probabilistic estimate as to the nature of what the optimal DAQ parameters are in the steps 6031-6034. To choose a DAQ sensor parameter configuration, example implementations sample from the probability distribution over the action space 6031. Using this action, data is then collected under this choice of sensor parameters, and the FFT is obtained at 6032, along with some possible signal processing (e.g., windowing, filtering, etc.]). Example implementations then determine a comparison between the FFTs of the signal gathered under maximal sensor parameter settings 6022 and the signal gathered under the choice of parameters sampled from the distribution 6032. Based on how close these two FFTs are to each other, a reward is received at 6033. This reward also considers how many bits were used to produce the signal, so that a signal achieving high precision and low number of bits will receive a large reward, while an equally precise signal that uses many bits will receive a relatively smaller reward. That is, if $X_G$ is the FFT from the ground truth parameters, and $X_L$ is the FFT from the parameters taken during the learning phase, then the reward received is:

$$\text{Reward} = \begin{cases} 0, & |X_G - X_L| > \tau \\ r(b), & |X_G - X_L| \leq \tau, \end{cases}$$

where $|\cdot|$ is a suitable metric between FFT vectors, and $\tau$ is a threshold parameter. The function r: $\mathbb{R}^+ \to [0,1]$ has the property that $$\text{as } b \to \infty, r(b) \to 0.$$

After this reward is received, this is used to update the system estimate about the optimal sensor DAQ parameters by updating the probability distribution 6034.

Figure 13:
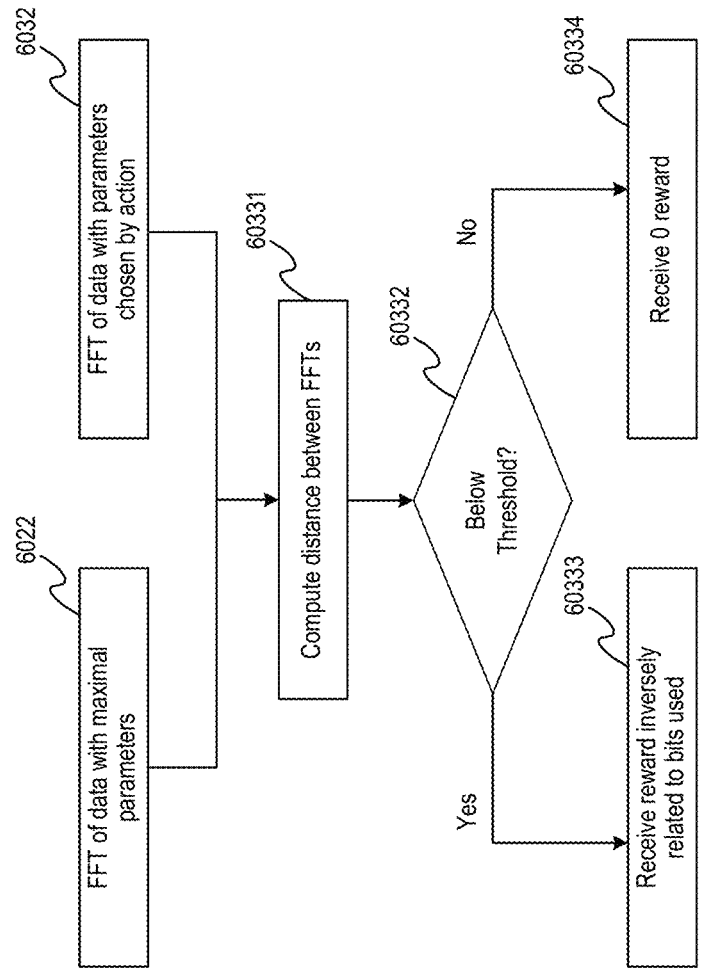
FIG. 13 illustrates an example for computing the reward, in accordance with an example implementation.

FIG. 13 illustrates an example for computing the reward, in accordance with an example implementation. The FFTs with both maximal sensor parameters and the parameters chosen from the action space 6022, 6032 are compared by computing the distance between them 60331 in some common ambient manifold, e.g., the $L^p$-norm between them in $\mathbb{R}^n$-space. After this distance is computed, the system checks this distance against a certain threshold 6032. If there are K>1 analog signals, a slightly more involved calculation is needed. If $X_G^1, \ldots, X_G^K$ are the K different ground truth FFTs, and likewise $X_L^1, \ldots, X_L^K$ are the K different learning phase FFTs, then a weighted sum of their distances is computed:

$$\sum_{k=1}^{K} \lambda_k |X_G^k - X_L^k|, \text{ where } \sum_{k=1}^{K} \lambda_k = 1, \text{ and each } \lambda_k \geq 0.$$

Here, $\lambda_1, \ldots, \lambda_K$ are constants that give relative importance to the different analog inputs. These weights may be specified based on an intended application, or if there is no preference for a specific input channel, a uniform weight of $$\frac{1}{K}$$

can be assigned to each channel. Now, if the value is not below a certain threshold 60332 (No), then the system gives no reward at 60334 for the sensor parameters sampled from the action space. On the other hand, if the distance is below a certain threshold (Yes), then the system gives a reward at 60333 that is inversely related to the number of bits used to send the signal(s).

For instance, if this weighted sum is below the required threshold at 60333, supposed $b_G$ bits per second are used to obtain the ground truth signal(s), and $b_L$ bits per second were used to produce the signal(s) in the learning phase. Then a suitable reward is $$r(b_L) = 1 - \frac{b_L}{b_G},$$

so that for large values of $b_L$ close to $b_G$, even though it is below the required threshold, only a small amount of reward is given. Observe that in general, if b bits per second are used to produce the signal(s) from the learning phase, then this can be calculated as $$b\frac{\text{bits}}{\text{second}} = (\# \text{ of analog input channels}) *$$

(sampling rate along each channel) $* (\# $ of bits per sample).

Hence, if any of the DAQ parameters become too large, even if the learning phase FFT is close to the ground truth FFT, then only a small reward is received.

The process of going back and forth between the ground truth estimation and learning phase will continue for some time, until either a certain number of cycles have been completed or there is a certain confidence level in the distribution that has been reached. At this point, the optimal sensor parameters can be selected based on a property of the learned probability distribution.

Figure 14:
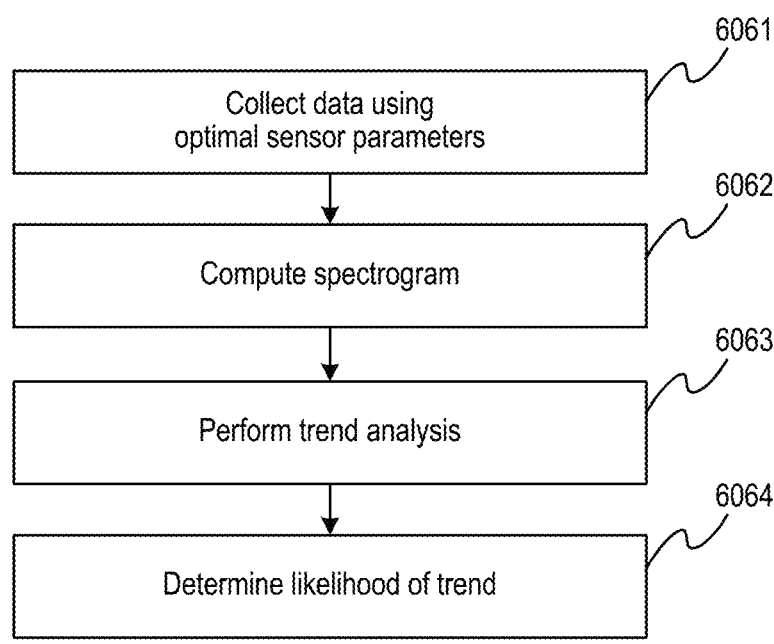
FIG. 14 illustrates the monitoring phase, in accordance with an example implementation.

FIG. 14 illustrates the monitoring phase, in accordance with an example implementation. Next, under the optimal DAQ parameter configuration learned above, the system enters the monitoring phase illustrated in FIG. 14 where the optimal DAQ parameters are fed into the DAQ and data collection proceeds 6061. After some time, the spectrogram is computed 6062 and a trend analysis 6063 is performed using time series analytic methods such as Recurrent Neural Networks (RNNs), Autoregressive Integrated Moving Average (ARIMA), or exponential smoothing to determine any trending behavior in the frequency components. Based on the likelihood of the trending behavior 6064, the system can either decide to continue monitoring by repeating the above steps, or if a significant enough trend is detected, then the system can decide to restart the module from the initialization phase 601.

Figure 15:
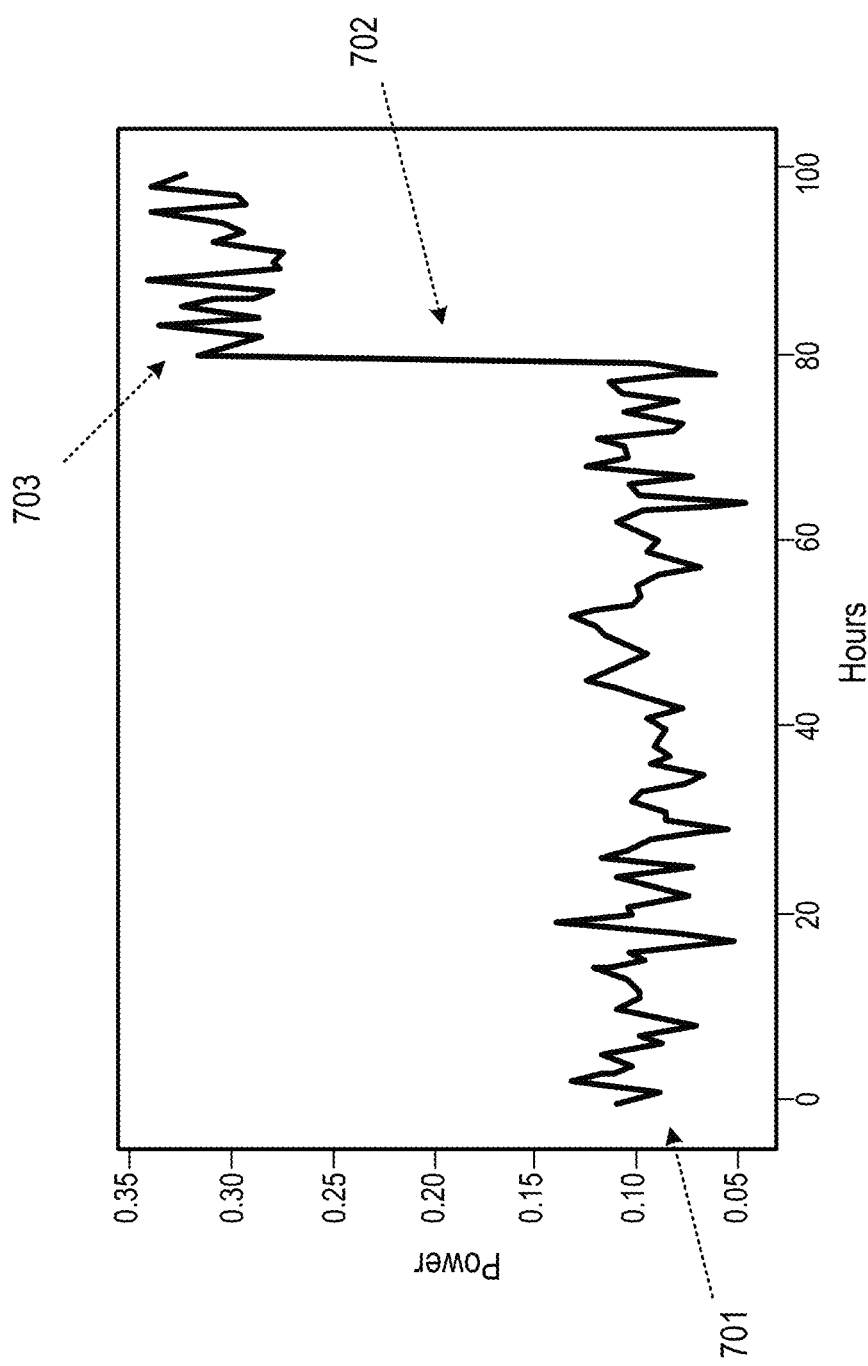
FIG. 15 illustrates an example execution of the monitoring phase, in accordance with an example implementation.

FIG. 15 illustrates an example execution of the monitoring phase, in accordance with an example implementation. An FFT component from the spectra of the signal recorded under the optimal DAQ parameters is depicted as it evolves over time. Initially at 701, the power in this component is sampled from a stationary signal. In this stage, a predictive model $\hat{X}[n]$ could be built using one of the previously mentioned techniques. Then, if there is a shift in the power of this FFT component as shown at 702, this would be reflected in a large error between the predicted model and the observed signal X[n]:

$$|\hat{X}[n] - X[n]| >> 0.$$

In this case, this indicates that the signal is now sampled from a new distribution as shown at 703—which might reflect a change at the level of the industrial asset. If this change was not accounted for during the learning phase, it is possible that the choice of DAQ parameters produced from the learning phase is missing out on important spectral information within the signal. Thus, the system must restart from the initialization phase. In general, it is not necessarily the case that the learning phase requires a stationary signal—in fact, the optimal DAQ parameters produced from the learning phase will consider the different distributions that the signal could have been sampled from. However, there is nothing preventing new states from appearing over time, thus the need for the monitoring phase.

Figure 16:
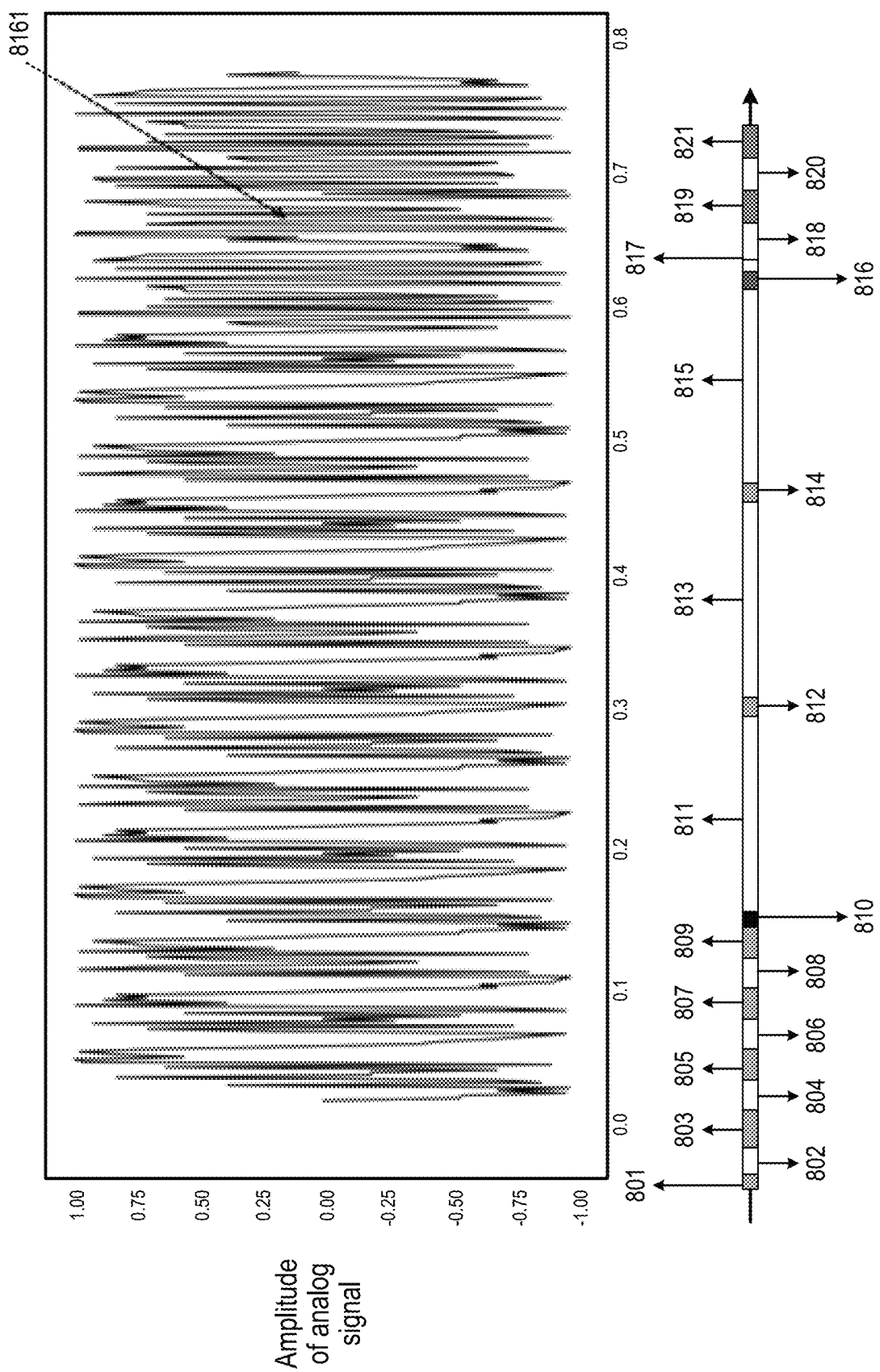
FIG. 16 illustrates a full scope of the timeline of the optimal DAQ configuration scheme, in accordance with an example implementation.

FIG. 16 illustrates a full scope of the timeline of the optimal DAQ configuration scheme, in accordance with an example implementation. Specifically, FIG. 16 illustrates a full scope of the timeline of the optimal DAQ configuration scheme in sync with the associated evolution over time of the analog signal. After the initialization phase 801, the system alternates between ground truth estimation phases 802, 804, 806, 808 and learning phases 803, 805, 807, 809 until optimal DAQ parameters are decided upon 810. At this point, the system begins its long-term monitoring phase by collecting data 811, 813, 815 and periodically checking for any unexpected deviations in the signal 812, 814, 816. When such a deviation is detected 816, this corresponds to a change in the frequency information within the analog signal 8161. At this point, the system restarts its search for the optimal DAQ parameters by launching another initialization phase 817, and a subsequent alternating schedule between the ground truth estimation phases 818, 820 and learning phases 819, 821.

Figure 17:
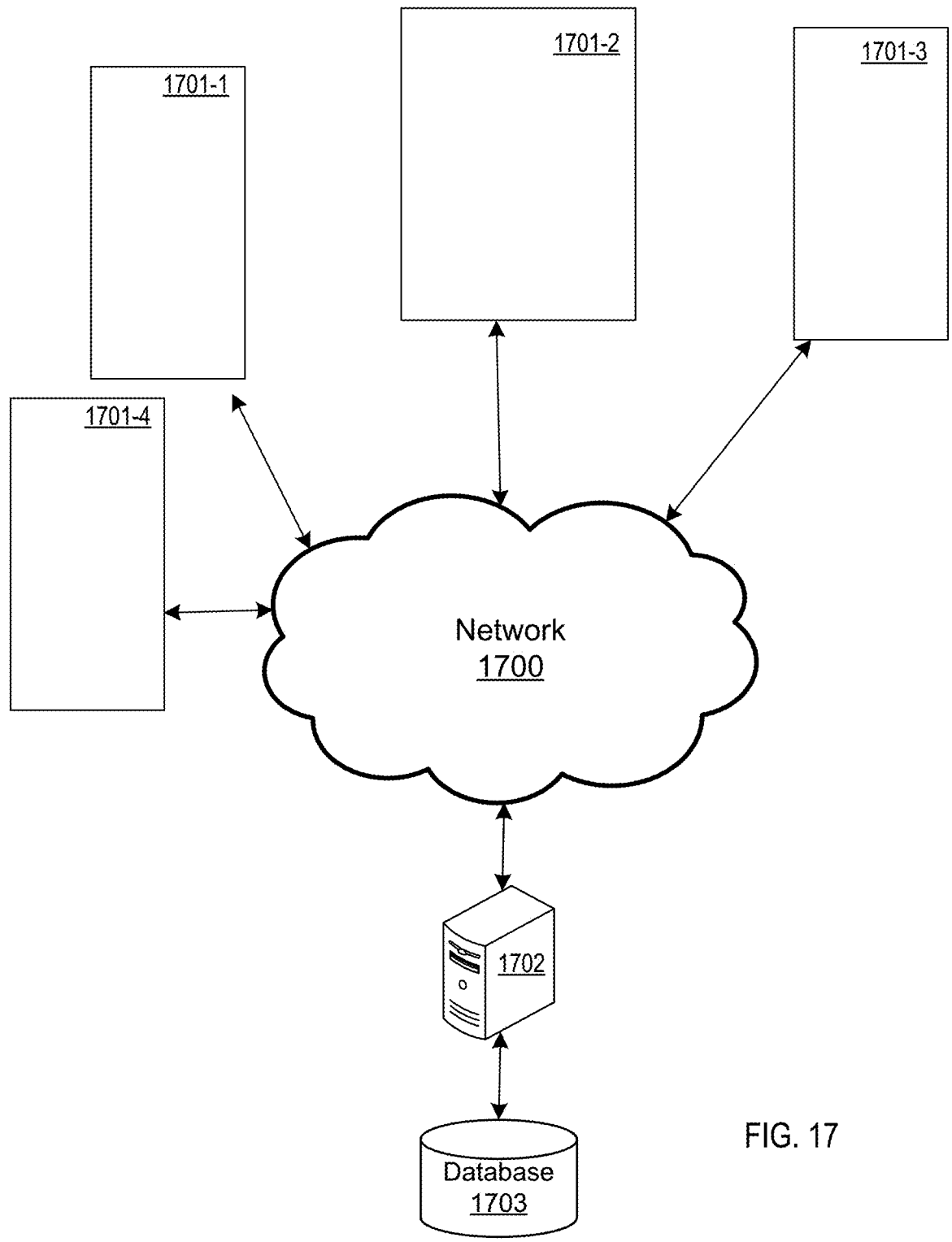
FIG. 17 illustrates a system involving a plurality of systems with connected sensors and a management apparatus, in accordance with an example implementation.

FIG. 17 illustrates a system involving a plurality of systems with connected sensors and a management apparatus, in accordance with an example implementation. One or more systems with connected sensors 1701-1, 1701-2, 1701-3, and 1701-4 are communicatively coupled to a network 1700 which is connected to a management apparatus 1702, which facilitates functionality for a DAQ system or an IoT gateway. The management apparatus 1702 manages a database 1703, which contains historical data collected from the sensors of the systems 1701-1, 1701-2, 1701-3, and 1701-4. In alternate example implementations, the data from the sensors of the systems 1701-1, 1701-2, 1701-3, 170-4 and can be stored to a central repository or central database such as proprietary databases that intake data such as enterprise resource planning systems, and the management apparatus 1702 can access or retrieve the data from the central repository or central database. Such systems can include robot arms with sensors, turbines with sensors, lathes with sensors, and so on in accordance with the desired implementation.

Figure 18:
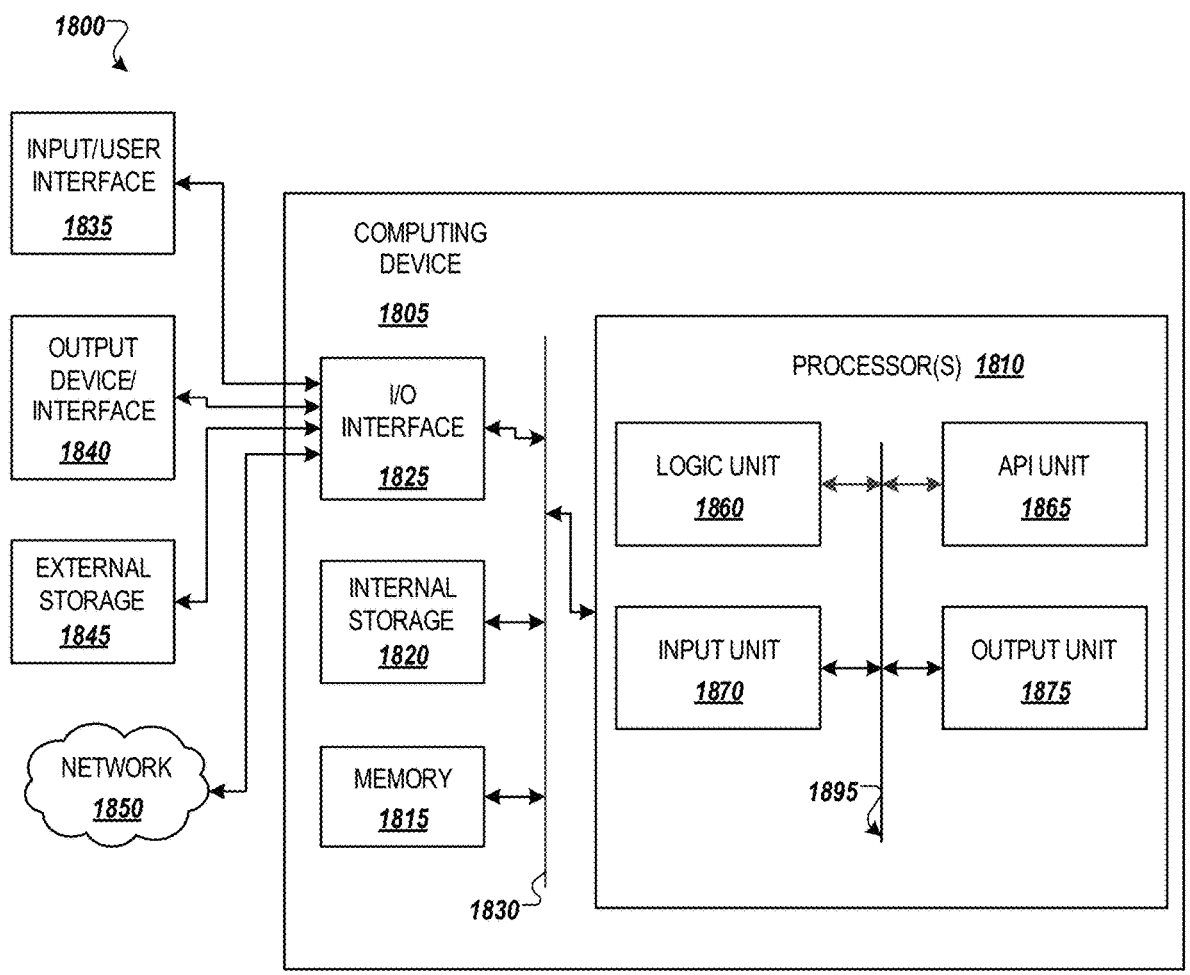
FIG. 18 illustrates an example computing environment with an example computer device suitable for use in some example implementations.

FIG. 18 illustrates an example computing environment with an example computer device suitable for use in some example implementations, such as a management apparatus 1702 as illustrated in FIG. 17 configured to act as a DAQ system or an IoT platform. Computer device 1805 in computing environment 1800 can include one or more processing units, cores, or processors 1810, memory 1815 (e.g., RAM, ROM, and/or the like), internal storage 1820 (e.g., magnetic, optical, solid state storage, and/or organic), and/or IO interface 1825, any of which can be coupled on a communication mechanism or bus 1830 for communicating information or embedded in the computer device 1805. IO interface 1825 is also configured to receive images from cameras or provide images to projectors or displays, depending on the desired implementation.

Computer device 1805 can be communicatively coupled to input/user interface 1835 and output device/interface 1840. Either one or both of input/user interface 1835 and output device/interface 1840 can be a wired or wireless interface and can be detachable. Input/user interface 1835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1840 may include a display, television, monitor, printer, speaker, braille, or the like. In some example implementations, input/user interface 1835 and output device/interface 1840 can be embedded with or physically coupled to the computer device 1805. In other example implementations, other computer devices may function as or provide the functions of input/user interface 1835 and output device/interface 1840 for a computer device 1805.

Examples of computer device 1805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1805 can be communicatively coupled (e.g., via IO interface 1825) to external storage 1845 and network 1850 for communicating with any number of networked components, devices, and systems, including one or more computer devices of the same or different configuration. Computer device 1805 or any connected computer device can be functioning as, providing services of, or referred to as a server, client, thin server, general machine, special-purpose machine, or another label.

IO interface 1825 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 1800. Network 1850 can be any network or combination of networks (e.g., the Internet, local area network, wide area network, a telephonic network, a cellular network, satellite network, and the like).

Computer device 1805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 1805 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1810 can execute under any operating system (OS) (not shown), in a native or virtual environment. One or more applications can be deployed that include logic unit 1860, application programming interface (API) unit 1865, input unit 1870, output unit 1875, and inter-unit communication mechanism 1895 for the different units to communicate with each other, with the OS, and with other applications (not shown). The described units and elements can be varied in design, function, configuration, or implementation and are not limited to the descriptions provided. Processor(s) 1810 can be in the form of hardware processors such as central processing units (CPUs) or in a combination of hardware and software units.

In some example implementations, when information or an execution instruction is received by API unit 1865, it may be communicated to one or more other units (e.g., logic unit 1860, input unit 1870, output unit 1875). In some instances, logic unit 1860 may be configured to control the information flow among the units and direct the services provided by API unit 1865, input unit 1870, output unit 1875, in some example implementations described above. For example, the flow of one or more processes or implementations may be controlled by logic unit 1860 alone or in conjunction with API unit 1865. The input unit 1870 may be configured to obtain input for the calculations described in the example implementations, and the output unit 1875 may be configured to provide output based on the calculations described in example implementations.

Processor(s) 1810 can be configured to a) sample the sensor data under a maximum DAQ parameters configuration for the system; b) learn an optimized DAQ parameters configuration for the system through a reinforcement learning process, and c) set the optimized DAQ parameters configuration for the sensors of the system based on the probability distribution over DAQ parameters as illustrated in FIG. 9. As illustrated in FIG. 9, the reinforcement learning process can involve sampling a DAQ parameters configuration from a probability distribution of DAQ parameters for the system; comparing a first fast Fourier transform (FFT) of the sampled sensor data under the maximum DAQ parameters configuration with a second FFT of the sampled sensor data under the sampled DAQ parameters configuration; and updating the probability distribution over DAQ parameters for the system based on the comparing.

Processor(s) 1810 can be configured to sample the sensor data with the optimized DAQ parameters configuration; and execute a machine learning model configured to detect a trend or a shift based on features extracted from a spectrogram derived from the sampling of the sensor data with the optimized DAQ parameters configuration as illustrated in FIG. 9 and FIG. 14.

Processor(s) 1810 can be configured to, for the machine learning model detecting a trend or shift, re-execute steps a), b), and c) above to relearn the optimized DAQ parameters configuration as illustrated in FIG. 9 and FIG. 14.

Depending on the desired implementation, processor(s) 1810 can be configured to compare the first fast Fourier transform (FFT) of the sampled sensor data under the maximum DAQ parameters configuration with the second FFT of the sampled sensor data under the sampled DAQ parameters configuration by computing a distance between the first FFT and the second FFT; and for the distance being below a threshold, assigning a reward to the sampled DAQ parameters configuration that is inversely related to bits used under the sampled DAQ parameters configuration as illustrated in FIG. 13.

Depending on the desired implementation, processor(s) 1810 can be configured to update the probability distribution of DAQ parameters for the system based on the comparing is conducted based on updating probabilities for the sampled DAQ parameters configuration based on the reward as illustrated in FIG. 12.

Example implementations described herein can dynamically adapt to changing nature of sensor data traffic and through AI, strike a good tradeoff between reducing volume of sensed data and retaining enough data fidelity so that subsequent analytics applications perform well. The example implementations described herein does away with heuristic methods of setting sensing parameters (such as DAQ sampling rate, resolution etc.) and replaces them with an automated, AI driven edge solution core that can be readily ported on any IoT edge gateway that is connected to the DAQ.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for a system comprising sensors providing sensor data, the method comprising:
   a) sampling the sensor data under a maximum DAQ parameters configuration for the system;
   b) learning an optimized DAQ parameters configuration for the system through a reinforcement learning process comprising:
      sampling a DAQ parameters configuration from a probability distribution of DAQ parameters for the system;
      comparing a first fast Fourier transform (FFT) of the sampled sensor data under the maximum DAQ parameters configuration with a second FFT of the sampled sensor data under the sampled DAQ parameters configuration; and
      updating the probability distribution over DAQ parameters for the system based on the comparing;
   c) setting the optimized DAQ parameters configuration for the sensors of the system based on the probability distribution over DAQ parameters;
   d) sampling the sensor data with the optimized DAQ parameters configuration; and
   e) executing a machine learning model configured to detect a trend or a shift based on features extracted from a spectrogram derived from the sampling of the sensor data with the optimized DAQ parameters configuration.

2. The method of claim 1, further comprising:
for the machine learning model detecting a trend or shift, re-executing steps a), b), and c) to relearn the optimized DAQ parameters configuration.

3. The method of claim 1, wherein the comparing the first fast Fourier transform (FFT) of the sampled sensor data under the maximum DAQ parameters configuration with the second FFT of the sampled sensor data under the sampled DAQ parameters configuration comprises:
computing a distance between the first FFT and the second FFT; and
for the distance being below a threshold, assigning a reward to the sampled DAQ parameters configuration that is inversely related to bits used under the sampled DAQ parameters configuration.

4. The method of claim 3, wherein updating the probability distribution of DAQ parameters for the system based on the comparing is conducted based on updating probabilities for the sampled DAQ parameters configuration based on the reward.

5. A non-transitory computer readable medium, storing instructions for a process executed on a system comprising sensors providing sensor data, the instructions comprising:
a) sampling the sensor data under a maximum DAQ parameters configuration for the system;
b) learning an optimized DAQ parameters configuration for the system through a reinforcement learning process comprising:
sampling a DAQ parameters configuration from a probability distribution of DAQ parameters for the system;
comparing a first fast Fourier transform (FFT) of the sampled sensor data under the maximum DAQ parameters configuration with a second FFT of the sampled sensor data under the sampled DAQ parameters configuration; and
updating the probability distribution over DAQ parameters for the system based on the comparing;
c) setting the optimized DAQ parameters configuration for the sensors of the system based on the probability distribution over DAQ parameters;
d) sampling the sensor data with the optimized DAQ parameters configuration; and
e) executing a machine learning model configured to detect a trend or a shift based on features extracted from a spectrogram derived from the sampling of the sensor data with the optimized DAQ parameters configuration.

6. The non-transitory computer readable medium of claim 5, the instructions further comprising:
for the machine learning model detecting a trend or shift, re-executing steps a), b), and c) to relearn the optimized DAQ parameters configuration.

7. The non-transitory computer readable medium of claim 5, wherein the comparing the first fast Fourier transform (FFT) of the sampled sensor data under the maximum DAQ parameters configuration with the second FFT of the sampled sensor data under the sampled DAQ parameters configuration comprises:
computing a distance between the first FFT and the second FFT; and
for the distance being below a threshold, assigning a reward to the sampled DAQ parameters configuration that is inversely related to bits used under the sampled DAQ parameters configuration.

8. The non-transitory computer readable medium of claim 7, wherein updating the probability distribution of DAQ parameters for the system based on the comparing is conducted based on updating probabilities for the sampled DAQ parameters configuration based on the reward.

9. A management apparatus for a system comprising sensors providing sensor data, the management apparatus comprising:
a processor, configured to:
a) sample the sensor data under a maximum DAQ parameters configuration for the system;
b) learn an optimized DAQ parameters configuration for the system through a reinforcement learning process comprising:
sampling a DAQ parameters configuration from a probability distribution of DAQ parameters for the system;
comparing a first fast Fourier transform (FFT) of the sampled sensor data under the maximum DAQ parameters configuration with a second FFT of the sampled sensor data under the sampled DAQ parameters configuration; and
updating the probability distribution over DAQ parameters for the system based on the comparing;
c) set the optimized DAQ parameters configuration for the sensors of the system based on the probability distribution over DAQ parameters;
d) sample the sensor data with the optimized DAQ parameters configuration; and
e) execute a machine learning model configured to detect a trend or a shift based on features extracted from a spectrogram derived from the sampling of the sensor data with the optimized DAQ parameters configuration.

10. The management apparatus of claim 9, wherein the processor is further configured to:
for the machine learning model detecting a trend or shift, re-execute steps a), b), and c) to relearn the optimized DAQ parameters configuration.

11. The management apparatus of claim 9, wherein the processor is configured to compare the first fast Fourier transform (FFT) of the sampled sensor data under the maximum DAQ parameters configuration with the second FFT of the sampled sensor data under the sampled DAQ parameters configuration by:
computing a distance between the first FFT and the second FFT; and
for the distance being below a threshold, assigning a reward to the sampled DAQ parameters configuration that is inversely related to bits used under the sampled DAQ parameters configuration.

12. The management apparatus of claim 11, wherein the processor is configured to update the probability distribution of DAQ parameters for the system based on the comparing is conducted based on updating probabilities for the sampled DAQ parameters configuration based on the reward.

* * * * *